United States Patent [19]

Dunn et al.

[11] 3,909,597

[45] Sept. 30, 1975

[54] HYBRID ANALOG AND DIGITAL COMPUTER

[75] Inventors: Robert M. Dunn, Eatontown; Bruce H. Gray, New Shrewsbury, both of N.J.

[73] Assignee: The United States of America as represented by the Secretary of the Army, Washington, D.C.

[22] Filed: May 22, 1974

[21] Appl. No.: 472,253

[52] U.S. Cl. .............................. 235/150.5; 235/151

[51] Int. Cl.$^2$ .......................................... G06J 1/00

[58] Field of Search .............. 235/150.5, 151, 151.1; 340/172.5, 147 R; 444/1; 324/73 AT

[56] References Cited

UNITED STATES PATENTS

| | | | |
|---|---|---|---|
| 3,330,943 | 7/1967 | Hawkins | 235/150.5 |
| 3,441,722 | 4/1969 | Gloess | 235/151 |
| 3,529,297 | 9/1970 | Landauer et al. | 340/172.5 |
| 3,532,861 | 10/1970 | Baumann et al. | 235/150.5 |
| 3,795,798 | 9/1972 | Endo et al. | 235/150.5 |

*Primary Examiner*—Joseph F. Ruggiero
*Attorney, Agent, or Firm*—Nathan Edelberg; Robert P. Gibson; Jeremiah G. Murray

[57] ABSTRACT

A hybrid analog and digital computer system consists of a graphics terminal, a programmable digital computer, a plurality of analog-to-digital and digital-to-analog converters, a switching system and an analog computer. An engineer working directly upon the graphics terminal, for example, with a light pen, may draw the analog computer circuits desired to be tested on the face of the terminal, which circuit would thereupon, through the digital computer, the converters and the switching network, be automatically patched for testing and analysis.

14 Claims, 2 Drawing Figures

HYBRID ANALOG AND DIGITAL COMPUTER

The invention described herein may be manufactured and used by or for the Government for governmental purposes without the payment of any royalties thereon or therefor.

BACKGROUND OF THE INVENTION

The present invention relates to a hybrid computer, that is, a computer which includes both an analog computer and a digital computer.

An analog computer is an electronic device which simulates, by its electrical characteristics, a set of mathematical operations. For example, an analog computer may have as its imputs various transducers measuring pressure, temperature, etc. The computer represents (presents an analog) the transducers' output by electrical parameters, performs mathematical operations such as division or multiplication and provides an electrical output representing the result of those operations.

An analog computer may consist of a number of modules each of which multiplies, divides or differentiates, each module generally including an operational amplifier and an impedance network. The impedances of the network may be varied to accomplish various functions or to represent selected values. At the present time the connections between the various modules of an analog computer are accomplished by means of a patch panel, which is a board having external terminals to which patch cables are removably connected. The values of the impedances are usually set through adjustable resistive potentiometers. The patch connections, and the values to which the potentiometers are set, are determined by the engineer, either by means of manual calculations or calculations using the aid of a digital computer.

After the engineer has set up the patch panel and set the potentiometer, he is ready to test the accuracy of the analog circuitry to see whether it accurately represents the equations, or the physical phenomena, he is attempting to represent. If, as it frequently happens, the equations or the physical phenomena are not accurately represented, then the inaccuracy must be diagnosed, either using calculations or cut-and-try methods, and the analog computer reset either by re-patching some of the patch cables or by resetting some of the potentiometers.

The analog computer, once it has been set up, is a model which the engineer utilizes in testing variations in one or more of the parameters. For example, the analog computer may represent a particular portion of a flight simulator, for example, the control of a helicopter rotor by means of a joy stick control. To determine the best values for the model, the engineer will vary the values of one or more of the parameters, for example, by changing the settings of the various potentiometers. In a conventional hybrid computer those changes, that is, the stepping over a plurality of values, may be accomplished by a programmed digital computer. The digital computer, in this instance, is used to change the values in the analog computer by stepping through the combinations of the values that are to be examined. The output of the analog computer may be recorded, for example, by a paper plotter display or other recording means. If the engineer finds that the results are still unsatisfactory, it may be due to his selection of the variables, or the sizes of the steps of each of the variables, or the ranges of variation of the variables. In any of those cases, the digital program must be changed and the entire problem rerun.

The basic difficulty with these procedures, in using the hybrid computer, is that such changes are time-consuming and costly. Because such changes are time-consuming, it may not be possible to establish an ongoing dialog (an interative closed self-corresting loop) between the engineer and the hybrid computer. If it were possible to instantly effect changes in the circuitry of the analog computer or instantly change testing values, a profitable dialog could be set up between the engineer and the hybrid computer, in which the engineer's ideas would immediately be transformed into a model. The fact that it may take anywhere from an hour to a month, depending upon the complexity of the analog computer and the digital program, to effect changes in either one of them, or both, may make it impossible for the engineer to directly and on an on-line basis interface with the hybrid computer. This lack of flexibility and of speed of response may be illustrated by the following additional examples.

First, in conventional hybrid computers an allocation is made as to which functions are performed by each of the analog and digital elements, these allocations being represented by the analog and digital computer programs. For example, the input to the analog computer may be a signal generator whose signals are representative of a temperature measuring instrument in a chemical process control situation whose temperature varies over time. The digital program, for example, may provide a stepped program representing various amounts of chemicals that are used in the process, which amounts would likewise vary with time in a predetermined manner. In this modeling of chemical processing plant, however, it may be desired, in the course of the modeling, to change the allocation of functions as between the analog and digital portions of the hybrid computer. This may require a time-consuming and costly off-line re-programming, a stopping of the modeling experiment and a re-commencement of the modeling experiment with the new programming.

A second example of the lack of flexibility and response of conventional hybrid computers is that if additional digital or logical functions must be added, it would again require a stopping of the experiment and a re-programming of the digital computer. For example, in the previous example of a modeling of a chemical processing plant, if it is desired to add new steps to the digital program, representing other types of chemicals, the software program for the digital computer must be re-programmed.

A third example of the lack of flexibility of conventional hybrid computers is when external devices are physically connected to the analog portion of the hybrid device. For example, such an external device, used as the electrical input to the analog computer, may be a transducer connected with some chemical process or a control used in a flight simulator or any other transducer device. The output signals may either be recorded for study or may be directly coupled to a further transducer, for example, to operate a valve in the chemical process plant case, or to change the pitch of the rotor in the flight simulator. Again, if changes are desired in the input or the output, or in the selection between them, an off-line re-programming must be accomplished in using conventional hybrid computers, which re-programming may be time-consuming, costly, and, perhaps most important of all, may destroy the rhythm of the experiment.

SUMMARY OF THE INVENTION

It is a feature of the present invention to provide a hybrid analog and digital computer system which includes a plurality of analog computer modules. Each of the analog computer modules has an operational amplifier and an associated impedance network, for example, a resistance network some of whose resistors are settable potentiometers. A switching system is connected to each of the external leads of the analog modules to connect and disconnect the modules in a variety of circuit configurations. The computer system also includes a digital computer and a graphics terminal including operator responsive means, such as a light pen or a joy stick, with the graphics terminal being connected to the digital computer. A plurality of analog to digital converters and a plurality of digital to analog converters through the switching system connect together the analog and digital computers. The digital computer is programmed to control the switching of the switching system to configure said analog computer modules in response to the engineer, or other human operator, controlling the operator responsive means.

It is an objective of the present invention to provide a hybrid computer in which the time and cost of configuring and patching the analog computer modules are minimized. The analog modules require a minimum patch panel for the set-up of the operational amplifier modules.

It is a further objective of the present invention to permit human experimenters to have an interactive control and participation in hybrid computer experiments, permitting the experiments to become part of an active self-improving interative real time loop.

It is a further objective of the present invention to provide a hybrid computer which an engineer may, using a graphics terminal, rapidly effect changes in an analog computer inner connections, thereby readily changing the model represented by such analog computer, for example, when the results go beyond pre-set bounds.

It is a still further objective of the present invention to provide that the analog modules, and particularly the potentiometers of their impedance networks and the interconnection switches between modules, are available to the human experimenter for manual changing and adjustment, so that the experimenter may view the real-time effect to the changes which he effects on the interactive graphics terminal.

It is still a further objective of the present invention to permit an engineer to lay out, using a menu of graphic symbols representing analog computer elements, on the face of the graphics terminal, an analog computer circuit including the interconnections between modules and the selection of impedance settings, within the modules, and automatically the circuitry and selected values will be obtained, thereby permitting the engineer to effect modular development and the allocation of functions in the hybrid model.

It is still a further objective of the present invention to provide a hybrid computer which itself may be the model of a further analog or hybrid computer facility; by permitting the rapid and easily setting up of an analog computer circuit, the engineer's concepts of the analog computer as the desired mathematical model may be verified by actual test before the other computer is patch-wired or otherwide programmed.

It is still a further ojective of the present invention to provide a hybrid computer in which the input to the analog computer may be an on-line external device undergoing test or control and the output of the analog computer is a recording means or controlled external device in which the engineer, by using the graphics terminal, may rapidly change the parameters and values of the analog computer and, in real time, see the immediate results of such changes.

BRIEF DESCRIPTION OF THE DRAWINGS

Other objectives of the present invention will be apparent from the detailed description set forth below taken in conjunction with the accompanying drawings.

In the drawings.

DETAILED DESCRIPTION OF THE INVENTION

Figure 1:
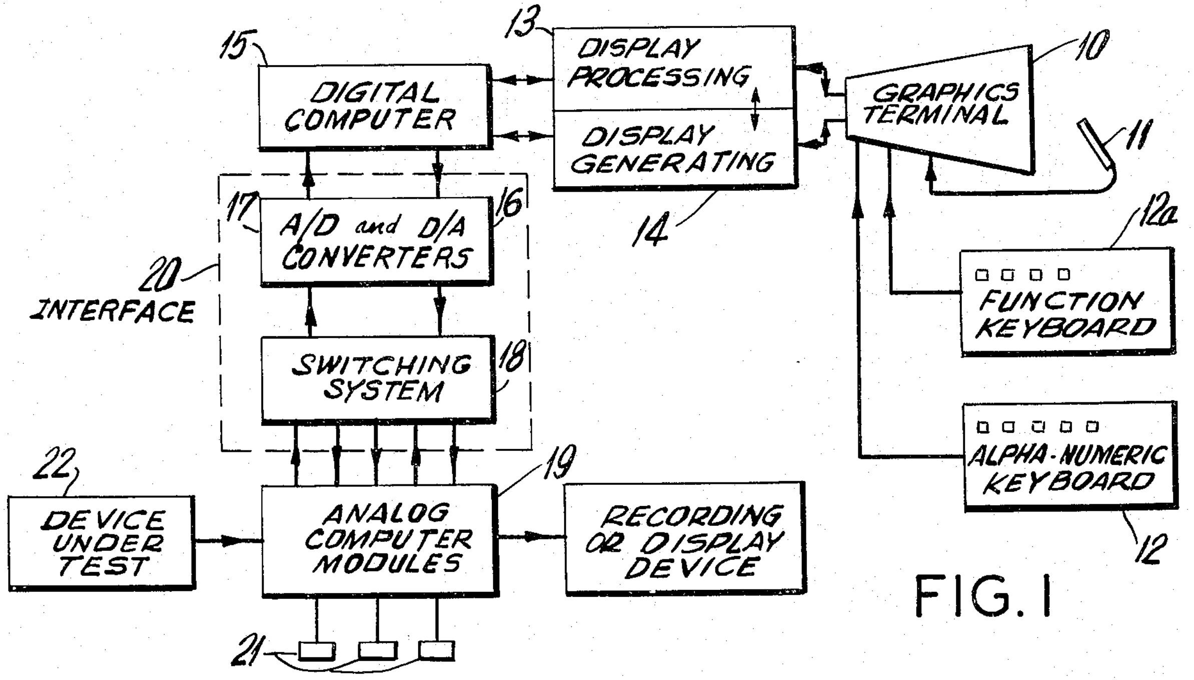
FIG. 1 is a block schematic diagram of the hybrid computer system of the present invention.

As shown in FIG. 1 the hybrid computer of the present invention includes a graphics terminal 10. The graphics terminal 10 has connected to it a gesturing mechanism 11. For example, the graphics terminal 10 may be a graphics console whose screen is the face of a CRT tube. The gesturing mechanism, for example, may be a light pen, a joy stick or a hand-held instrument producing noise or electrostatic charge. Preferably the terminal facilities also include an alpha-numeric keyboard 12 and a program function keyboard 12*a*.

The graphics terminal 10 has both input and output connections to the display processing unit 13 and the display generating unit 14 respectively. Those two display units 13 and 14 are connected to a mini-digital computer 15, for example, capable of processing a work length of 16–18 bits. A product known as "Idiiom", available from Information Displays, Inc., includes the graphics terminal, a gesturing mechanism which is a light pen, a mini-computer and the display processing unit and display generating unit. Alternatively the graphics terminal and display processing unit and display generating unit may be procured from other manufacturers, namely, Princeton Electronic Products, Inc., North Brunswick, New Jersey, whose mechanism 11 is a joy stick; Imlac Corporation of Needhorm, Massachusetts; Addage, Inc., of Boston, Massachusetts; and Computek of Cambridge, Massachusetts. Suitable mini-digital computers are available from various manufacturers, including the Varian 620F available from Varian, and PDP-11 available from Digital Equipment Corp., Massachusetts.

The digital computer 15 is connected to an interface 20 consisting of a plurality of digital to analog converters 16 and a plurality of analog to digital converters 17 and a switching system 18. The converters, in the case of the digital to analog converters 16, change the program received from the digital computer (in the form of binary numbers) to analog signals for the control of the analog computer. For example, the software program of the digital computer may be in the form of magnetic tape which would have a certain potentiometer setting in the form of a binary number. At the proper time that binary number would be transmitted to one of the digital to analog converters which would convert the binary number to a physical position or setting of a potentiometer arm. The analog to digital converter 17 is used to inform the mini-computer of the status of the configuration of the analog computer and of its settings.

The mini-computer, acting with the display generating unit 14, will, upon receipt of such signals and conversion into digital form, display that information on the graphics terminal 10. Both the digital to analog and analog to digital converter 17 are connected to a switching system 18. Preferably the switching system 18 is an electromechanical or electronic switching system. For larger scale installations a suitable, although slow, switching system may be an electromechanical cross-bar system of the type available from Northern Electric Company. An alternative is an electronic switching system which may be of the type used for private telephone systems. Such electronic switching systems are available in the form of a number of connected integrated circuits which are available from such manufacturers as Texas Instruments and Motorola. The digital to analog converters and the analog to digital converters are well-known in the art and available from Electronic Associates, Inc., of New Jersey.

The switching system 18 is connected to the analog computer 19 which consists of a plurality of computer modules. Such an analog computer is available from Electronic Associates, Inc., of New Jersey. Each module of the computer includes an operational amplifier and an impedance network.

External controls 21 are connected to some, or all, of the analog computer modules. For example, those external controls 21 may be hand-operated potentiometer knobs. The device under test 22, which may, for example, be a signal generator simulating a transducer output, or the electrical output of a transducer, is connected to the analog computer modules 19 at its input. The output of the analog computer modules 19 is connected to a recording or display device, for example, an ink plotter or an oscilloscope or to the mini-computer 15 through the switching system 18 and A/D and D/A converters 16 and 17.

Figure 2:
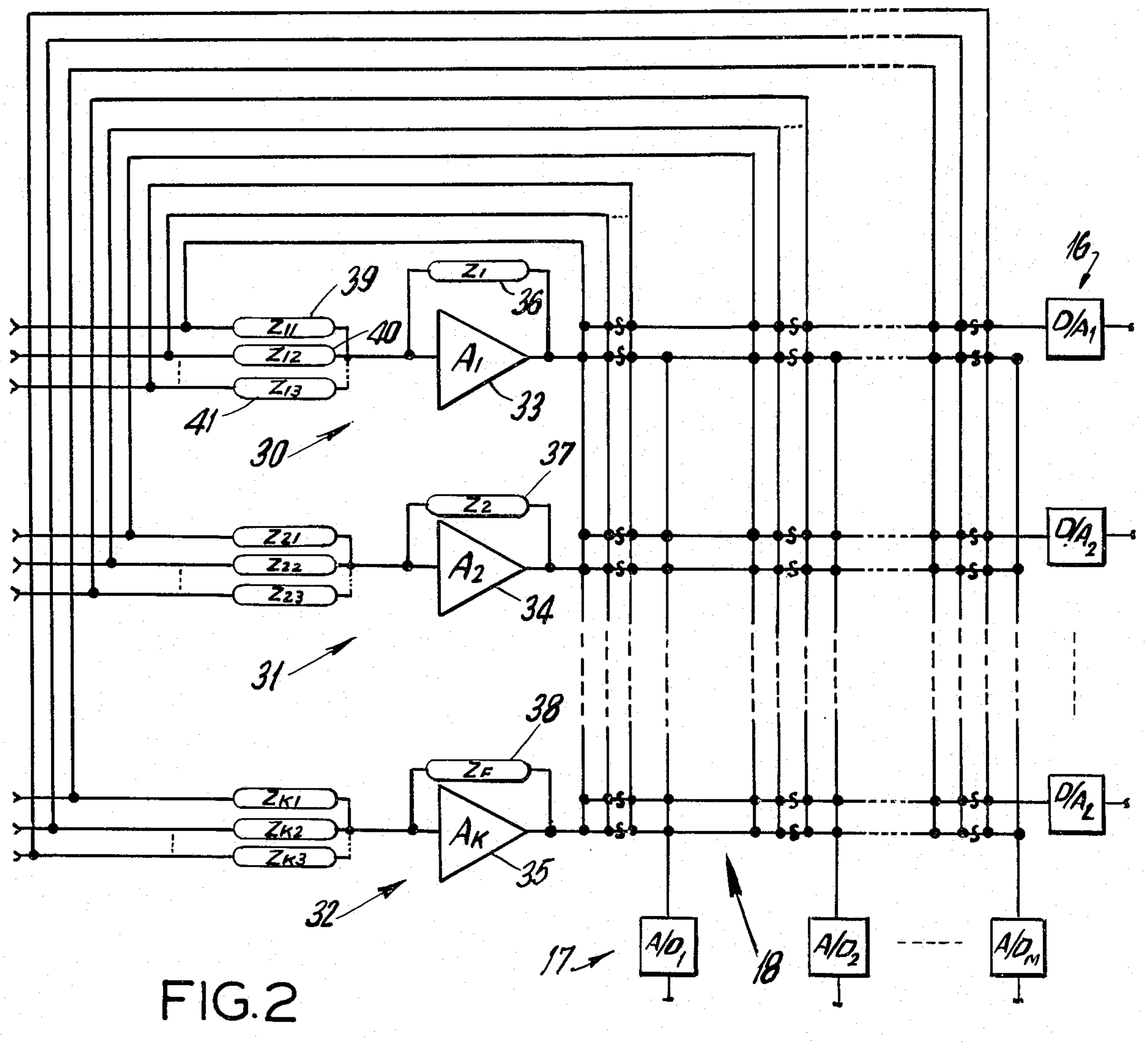
FIg. 2 is a schematic diagram showing the analog computer modules, the switching system and the analog to digital and digital to analog converters.

As shown in FIG. 2, the computer modules are adapted: (a) to be automatically connected or disconnected by the switching system, and (b) to have their impedance elements set, as to impedance value, by the switching system. FIG. 2 is a small part of the analog computer, only three analog modules being illustrated. Each analog computer module 30, 31, 32 includes an operational amplifier $A_1$, $A_2$, $A_K$, respectively, 33, 34, 35. For purposes of illustration, each operational amplifier has associated with it an impedance network, which is shown as including one settable feedback impedance ($Z_1$, $Z_2$ . . . $Z_F$) 36, 37, 38 respectively, each of which may be a potentiometer which may be automatically set by the switching system or manually set.

Each operational amplifier has three settable input impedances; in module 30 those input impedances are 39, 40 and 41 ($Z_{11}$, $Z_{12}$, $Z_{13}$). The input impedances in module 31 are labeled $Z_{21}$, $Z_{22}$, $Z_{23}$ and those in module 32 are labeled $Z_{K1}$, $Z_{K2}$, $Z_{K3}$. The number of input impedances may be more or less than three. The elongated rounded symbol around $Z_1$ . . . $Z_F$ and $Z_{11}$ . . . $Z_{KJ}$ shows that those impedances may be automatically or manually set, for example, they may be potentiometers. The small circles illustrate digitally controlled crosspoint switches within the switching system 18. The symbol S illustrates that more lines are possible. In FIG. 2 the D/A converters 16 are connected to open or close the switch crosspoints and the A/D converters will provide an indication, to the graphics terminal, as to whether those crosspoints are opened or closed.

The size of the system may be seen from the following calculations. Assuming there are (1) K operational amplifiers each with $J_o$ inputs; (2) L Digital-to-Analog converters; and (3) M Analog-to-Digital Converters; where K, L and M are numbers. There will be: (1) At most $J_oK(K+L)$ digitally controlled programmable switches that will pass signals to or from the operational amplifiers; (2) $(J_o+J_1)K$ manual adjustment devices for operational amplifier settings where $J_1$ is the additional controls required for each operational amplifier; and (3) M manually or programmably controlled digital switches that will pass signals from the analog-to-digital converters. The number of switch points of the switching system will be, if there are 10 to 100 analog computer modules, relatively large — but within the capability of present electronic switching systems.

It will be appreciated that the hybrid computer of the present invention will have many applications in various fields of engineering. The examples of some of these applications are set forth below only by way of illustration and not limitation. One such example is that the hybrid computer system of the present invention may be used for a variety of applications with special purpose computers that "interpret" the system's capabilities and utilize those capabilities in the terms, data references and model types of the given area of application of the special purpose computers. Other examples of applications are:

1. The analysis of dynamic trends having data distributions that change as a function of time;

2. The simulation and modeling of functions and systems whose mathematical models are within the capacity of the system to perform calculations;

3. The interactive control of experiments involving external devices under test in which the hybrid system is modeling the environment of the external device under test or analysis;

4. Interactive pattern recognition and/or analysis based on distributional, clumped or fuzzy set data;

5. Heuristic optimization through variable sensitivity analysis of functions and systems that are represented by hybrid models within the computational capabilities of the system;

6. The high speed interactive control of a multiple CRT system. The small digital computer (digital computer 15) is used to control the CRT's with automatically programmed operational amplifiers of the analog computer 19 used for simplifying and increasing the rate and capacity of control over the multiple CRT's.

As a still further example, the analog computer modules 19 may be replaced by logic elements, for example, "and" "or" "nand" "nor" gates. The switching system will, under control of the graphics terminal, effect the engineer's selection of the interconnections between logic element modules to test or verify or "breadboard" a logic circuit.

In operation, an engineer may sit in front of the screen of a graphics terminal and view a collection of elements on the "menu" at the bottom of the screen, which menu may be a pictorial representation of electrical symbols representative of the analog modules and their possible settings. He may then point and operate the gesturing device, such as the light pen, at an analog module and then point and operate the gesturing device at a location on the screen. The symbol will appear at the pointed-at location on the screen and also the switching system will effect the switching to place that module into the analog computer circuit. He will repeat the process until the complete circuit is shown on the screen and simultaneously connected. He will then, as described previously, run testing and verification on the analog circuit and change the modules and values of the impedances to improve and test the analog model.

In an alternative procedure, utilizing the hybrid computer of the present invention, the entire unconnected circuit, or portions of the circuit, is shown on the screen, similar to FIG. 2, with the connection points open. The engineer may then point and operate the gesturing device at the connection points he wishes to close or impedances he wishes to set, the closing or setting being automatically effected by the switching system.

We claim:

1. A hybrid analog and digital computer system, for use in an iterative closed self-correcting loop between an operator and a hybrid analog and digital computer, including a plurality of analog computer modules, each of said modules having an operational amplifier and an associated impedance network, a switching system connected to each of said modules to connect and disconnect said modules in a variety of configurations, a plurality of analog to digital converters and a plurality of digital to analog converters. both pluralities of converters being connected to said switching system, a programmable digital computer connected to said converters, a graphics terminal including operator responsive means, said graphics terminal being connected to said digital computer, said digital computer being programmed to control the switching of said switching system to configure said analog computer modules in response to operator initiated selection of said operator responsive means, and to provide said operator, via said graphics terminal, with the most recent display of the configuration of said analog computer modules for further on-line reconfiguration by said operator through said operator responsive means.

2. A hybrid computer as in claim 1 wherein said switching system is an electronic switching system.

3. A hybrid computer as in claim 1 wherein said digital computer is programmed to perform display processing for said graphics terminal.

4. A hybrid computer as in claim 1 wherein said operator response means is a gesturing mechanism.

5. A hybrid computer as in claim 4 wherein said gesturing mechanism is a light pen.

6. A hybrid computer as in claim 4 and further including an alphanumeric keyboard connected to said digital computer.

7. A hybrid computer as in claim 1 wherein a portion of said digital computer is hard wired to perform as a display processing unit and a display generating unit, said portion being connected to said graphic terminal.

8. A hybrid computer as in claim 1 wherein at least some of said analog modules have operator hand settable impedance controls.

9. A graphics controlled digital computer system, for use in an iterative closed self-correcting loop between an operator and a graphics controlled digital computer, including a plurality of circuit modules, each of said modules having an active electronic device and an associated impedance network, a switching system connected to said of said modules to connect and disconnect said modules in a variety of operable circuits, a plurality of analog to digital converters and a plurality of digital to analog converters, both pluralities of converters being connected to said switching system, a programmable digital computer connected to said converters, a graphics terminal including operator responsive means, said graphics terminal being connected to said digital computer, said digital computer being programmed to control the switching of said switching system to connect said modules in response to operator initiated selection of said operator responsive means, and to provide said operator, via said graphics terminal, with the most recent display of the configuration of said analog computer modules for further on-line reconfiguration by said operator through said operator responsive means.

10. A system as in claim 9 wherein said modules are logic gate elements.

11. A system as in claim 10 wherein said logic gate elements are "and", "or" and "not".

12. A system as in claim 10 wherein said logic gate elements are "nand" gates and "nor" gates.

13. The method of representing, verifying, and re-representing in an iterative closed self-correcting loop a model by the operations of an analog computation utilizing a hybrid analog and digital computer system including a plurality of analog computer modules, each of said modules having an operational amplifier and an associated impedance network, comprising the steps of:

1. initiating the configuration of the circuitry and values of the analog computer by operation of an operator responsive means of a graphics terminal,
2. automatically and through a predetermined series of steps in the program of a digital computer, producing a sequence of digital control commands corresponding to said operation,
3. converting, by means of a plurality of analog to digital converters and a plurality of digital to analog converters, the digital controls into the automatic control of the switching of a switching system to configure said analog computer modules into an analog computer circuit by means of the switching system being connected to each of the modules to connect and disconnect the modules in a variety of configurations,
4. testing and verification of the model by connection of at least one external electrical input to said configured analog computer and observing the electrical output of the analog computer to verify the model, and
5. repeating steps (1) through (4) in seriatim until a desired result is obtained under said testing and verification step.

14. A hybrid computer as in claim 1 wherein said digital computer contains means for automatically setting at least one of said impedance networks.

* * * * *